United States Patent [19]

von Berckheim

[11] 3,840,788

[45] Oct. 8, 1974

[54] ARRANGEMENT FOR PRODUCING AN ELECTROSTATIC STEADY FIELD

[76] Inventor: Constantin Graf von Berckheim, Friedrichstrasse 9, 6940 Weinheim, Germany

[22] Filed: Nov. 28, 1973

[21] Appl. No.: 419,725

[30] Foreign Application Priority Data
Dec. 2, 1972 Germany.......................... 2259173

[52] U.S. Cl............................. 317/262 AE, 307/11
[51] Int. Cl. ........................... A61n 1/10, H02j 1/00
[58] Field of Search ..... 317/2 R, 4, 262 R, 262 AE; 307/11, 15 D

[56] References Cited
UNITED STATES PATENTS 2,152,184  3/1939  Gostin et al. ......................... 307/11
2,798,151  7/1957  Fletcher et al......................... 307/11
3,089,042  5/1963  Hickey et al.......................... 307/11

FOREIGN PATENTS OR APPLICATIONS
976,815  3/1951  France

*Primary Examiner*—L. T. Hix
*Attorney, Agent, or Firm*—Michael S. Striker

[57] ABSTRACT

An electrode of a steady-field producing arrangement is connected to a high-voltage DC source, and a counter electrode is connected to ground. The invention utilizes instead of a high-voltage DC source the DC output of a television receiver high-voltage supply, to which a voltage divider having a resistance of at least $10^7$ ohm is connected, and to a tap of which one of the electrodes is, in turn, connected.

7 Claims, 2 Drawing Figures

ARRANGEMENT FOR PRODUCING AN ELECTROSTATIC STEADY FIELD

BACKGROUND OF THE INVENTION

The present invention relates generally to an arrangement for producing an electrostatic steady field, particularly for the climatization of air.

The advantages of producing in an enclosed space an electrostatic steady field—in terms of the well-being of humans exposed to such a field—are by now well established and well known. Reference may be had to my prior U.S. Pat. No. 3,583,754 concerning the considerations behind the use of such a field for air climatizing purposes, and an arrangement for establishing and maintaining such a field.

It is known to use in such an arrangement a ceiling electrode which is mounted at or adjacent the ceiling of an enclosed space and which is electrically insulated. This ceiling electrode is connecting to a high-voltage positive DC source, whereas a counter electrode is provided which is connected to ground. It is also possible to use as counter electrodes the boundary walls bounding an enclosed space, such as a room, a vehicle or the like. The use of electrostatic steady fields is not limited to air climatization, or to ionization of the air, but can also be employed for other purposes.

In any case, it is always necessary to produce the field by means of a high DC voltage, for which an expensive generator is required. An attempt is known from the prior art to use low voltage, for which purpose the first electrode is so arranged that it is located immediately adjacent a person who is to be exposed to the field. This, however, is a highly specialized application which is suitable only in some circumstances, for instance in the confined space of a motor vehicle passenger compartment. In other instances, this approach cannot be used.

SUMMARY OF THE INVENTION

Accordingly, it is a general object of the present invention to provide an improved steady-field generating arrangement which avoids the disadvantage of the prior art.

More particularly, it is an object of the present invention to provide an arrangement for producing a steady field which does not require the expensive high-voltage generator previously needed.

In keeping with the above objects, and with others which will become apparent hereafter, one feature of the invention resides, in an arrangement for producing an electrostatic steady field, particularly for air climatization, wherein one electrode is connected to a high-voltage DC source and a counter electrode is connected to ground, the improvement wherein one of the electrodes is connected with a tap of a voltage divider having a resistance of at least $10^7$ ohm. The voltage divider is connected to ground and also connected to the DC output of a television receiver high-voltage supply intermediate the output and the picture tube which is connected to the output. It is particularly advantageous if the resistance of the voltage divider is on the order of $10^9$ ohm or even higher.

The present invention is based on the realization that a direct current in excess of 10 kv, for instance 13 kv in the case of many small and 20 kv in the case of many large television picture tubes, is available at the DC output of the high-voltage supply of a television receiver. Television receivers are so widely used now that it can be assumed that most every household is supplied with such equipment, so that the installation of a steady-field generating arrangement with which the present invention is concerned, can be made economically possible in circumstances where the reduction of the expense for the arrangement by the amount previously required for the high-voltage generator can spell the difference between the ability or inability of a user to purchase such equipment.

Actually, the high voltage applied at the DC output of a television receiver is greater than needed for the arrangement according to the present invention. However, by employing the voltage divider mentioned earlier, it is possible to obtain a voltage of desired level. The very high resistance employed in the voltage divider assures that the current which is withdrawn from it is so small that a disadvantageous influence upon the picture on the picture tube will not be observed. This is all the more true as the electrode which is connected with the voltage divider will require only a negligible amount of current after it has been initially switched on and charged to the capacitance required to exist between the electrode and the counter electrode. Moreover, the portion of the voltage divider which is located between the DC output and the tap from which the current for the electrode is withdrawn, constitutes a high-ohmic preresistor for the first electrode so that this arrangement makes it possible to eliminate the specific safety resistors which normally are incorporated in this type of arrangement to prevent electric shocks in the event a user should touch the electrode accidentally.

It is particularly advantageous if the voltage divider is connected to the positive DC output of the television power supply, so that the electrode which is connected with it—for instance a sealing electrode—has positive polarity. This means that the steady field so produced then has the orientation which normally exists in nature for such fields. It is conventional to ground the secondary winding of the high-voltage transformer in television sets, so that it is not necessary to provide a connecting wire between the counter electrode, the base point of the voltage divider and the grounded connection of the secondary winding.

I have found it to be particularly advantageous if the voltage divider is provided with a voltage-dependent resistor so that any fluctuations in the voltage at the DC output result in a variation in the cross flow through the voltage divider, meaning that the voltage at the tap will be maintained at least substantially constant at all times.

According to a currently preferred embodiment, the voltage divider is provided with several taps from which different voltages can be derived, and the portion of the voltage divider which is directly connected with the DC output is a fixed resistor which is inaccessible, that is which cannot be touched intentionally or otherwise. In particular, it is advantageous if the fixed resistor is mounted in a plug used to establish a connection between the voltage divider and the DC output, because in this manner it is assured that at least the fixed resistor is always connected between the DC output and the tap and acts as a safety resistor for the electrode connected with the tap.

The voltage divider may be provided with a resistor in form of a ceramic bar or rod, on which the taps are shiftable so that by shifting the taps to different positions, different desired voltages can be selected and obtained for supply to the electrode connected to the respective tap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
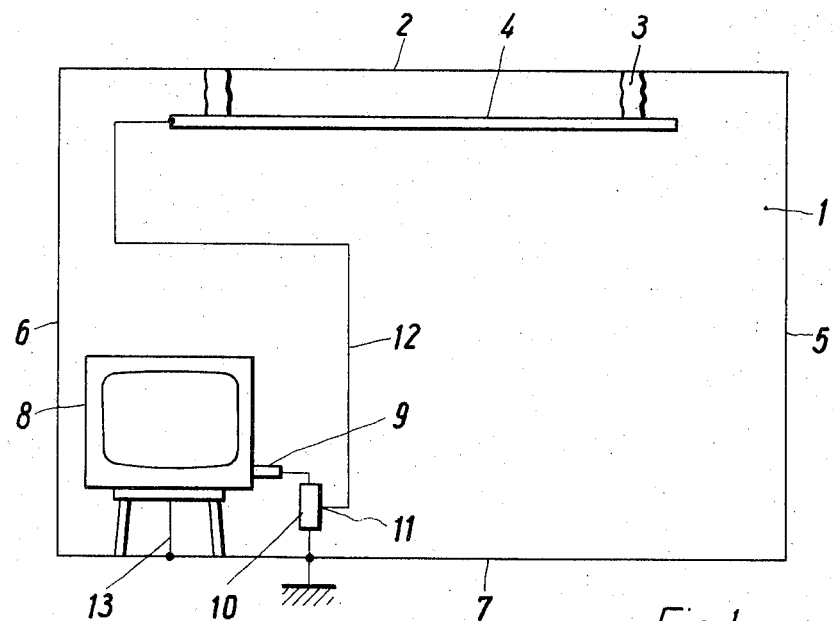
FIG. 1 is a diagrammatic side elevational view illustrating an arrangement according to the present invention incorporated in a room.
Figure 2:
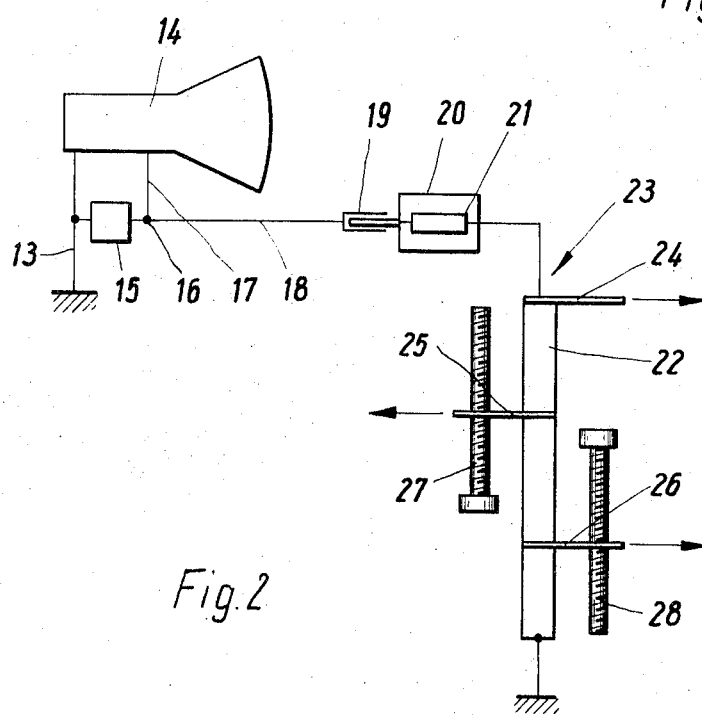
FIG. 2 is a diagram showing the structural details and connections of the arrangement in FIG. 1.

Referring now to FIGS. 1 and 2 in detail, it will be seen that reference numeral 1 diagrammatically identifies a room having a ceiling 2. A ceiling electrode 4 is mounted on the ceiling 2 by means of insulators 3. In this embodiment, it is the side walls 5 and 6 and the floor 7 of the room 1 which are connected to ground and which constitute a counter electrode for the electrode 4. A steady field is to be produced in the room 1 between the electrodes 4 on the one hand, and 5, 6, 7 on the other hand. A television set 8 is accommodated in the room 1, and a plug 9 connects a voltage divider 10 with the positive DC output of the high-voltage power supply of the set 8. No details of high-voltage power supply of television set 8 need be illustrated or described as these are, of course, very well known per se. Reference numeral 11 identifies a tap of the voltage divider to which a conductor 12 is connected which connects the tap 11 with the ceiling electrode 4. The television set 8 is connected to ground by a conductor 15.

FIG. 2 shows the picture tube 14 of the television set 8 with the associated high-voltage power supply 15 that is present in every television set and supplies voltage for the picture tube 14. The output of the power supply 15 is identified with reference numeral 16, and a positive high direct current of approximately 20 kv is available at the output 16, which is derived from the secondary side of a high-voltage transformer via a rectifying arrangement, and in some instances via smoothing condensers. The construction of such power supplies is well known, as mentioned earlier.

The output 16 is connected via a conductor 17 with the picture tube 14. It is also connected via a conductor 18 with a socket 19 into which a plug 20 can be inserted which accommodates a fixed resistor 21. Connected in series with the resistor 21 is a voltage-dependent resistor 22 which in the illustrated embodiment is in form of a ceramic rod or bar. The resistors 21 and 22 together form the voltage divider which in FIG. 2 I have chosen to designate with reference numeral 23. In the illustrated embodiment, the voltage divider 23 is provided with a fixed tap 24 and with two adjustable taps 25 and 26 each of which can be fixed in a selected position by means of a screw 27 or 28.

If the fixed resistor has a value of 200 meg-ohm and the voltage dependent resistor 22 has in normal operation a value of 1,800 meg-ohm, the cross current through the voltage divider 23 amounts to 10 mA. This means that the tap 24 supplies a voltage of 18 kv, the tap 25 has a voltage of between 9 and 18 kv depending upon its position along the ceramic rod, and the tap 26 a voltage of between 0 and 9 kv, again depending upon its selected position. Under these circumstances, the ceiling electrode 4 is connected with the tap 26 and the latter set to a value which is dependent upon the height of the room 1 and the desired field strength, and which usually will be between substantially 2.5 and 4 kv. A voltage of 8 kv, on the other hand, can be used for operating an electro-filter which is based upon the same principle as the arrangement shown in FIGS. 1 and 2, but does not, of course, serve for producing a steady field for the same purpose as described with reference to FIG. 1. If ionization of air by the steady field is desired, then the tap may be set to, for instance, 11 kv.

It is evident that if only a single voltage is required, that is if adjustments for different voltages are not needed, a voltage divider having a single fixed tap can be utilized.

The value of the resistance of the voltage divider depends upon the television set, or rather the high voltage supply of the television set with which the voltage divider is to be used. If the power supply is sufficiently strong, values of the voltage divider on the order of $10^7$ or $10^8$ ohm may be sufficient, rather than $10^9$ or higher.

It will be understood that each of the elements described above, or two or more together, may also fine a useful application in other types of constructions differing from the type described above.

While the invention has been illustrated and described as embodied in a steady field generating arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. In an arrangement for producing an electrostatic steady field, particularly for air climatization, wherein one electrode is connected to a high-voltage DC source and a counter electrode is connected to ground, the improvement wherein said one electrode is connected with a tap of a voltage divider which has a resistance of at least $10^7$ ohm and which is connected between ground and interposed between a DC output of a television receiver high-voltage supply and the picture tube connected to said DC output.

2. In an arrangement as defined in claim 1, wherein the resistance of said voltage divider is on the order of at least $10^9$ ohm.

3. In an arrangement as defined in claim 1, wherein said DC output is a positive output of said high-voltage supply.

4. In an arrangement as defined in claim 1, wherein said voltage divider comprises a voltage-dependent resistor.

5. In an arrangement as defined in claim 1, said voltage divider having a plurality of outputs for different voltages, and including an inaccessible fixed resistor which is connected to said DC output of said high-voltage supply.

6. In an arrangement as defined in claim 5, wherein said voltage divider further includes a connecting plug for electrical connection with said DC output, and wherein said fixed resistor is mounted in said plug.

7. In an arrangement as defined in claim 1, wherein said voltage divider comprises a resistor formed as a ceramic bar on which output members are slidably mounted.

* * * * *